US009706574B2

(12) United States Patent
Lim et al.

(10) Patent No.: US 9,706,574 B2
(45) Date of Patent: Jul. 11, 2017

(54) WIRELESS COMMUNICATION SYSTEM AND PACKET COMMUNICATION THEREFOR (71) Applicant: GWANGJU INSTITUTE OF SCIENCE AND TECHNOLOGY, Gwangju (KR)

(72) Inventors: Hyuk Lim, Gwangju (KR); Wooyeol Choi, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 129 days.

(21) Appl. No.: 14/524,439

(22) Filed: Oct. 27, 2014

(65) Prior Publication Data

US 2015/0131574 A1    May 14, 2015

(30) Foreign Application Priority Data

Nov. 14, 2013  (KR) .......................... 10-2013-0138075

(51) Int. Cl.
*H04W 72/04* (2009.01)
*H04W 74/08* (2009.01)

(52) U.S. Cl.
CPC ............... *H04W 74/0816* (2013.01)

(58) Field of Classification Search
CPC ............. H04W 74/0825; H04W 72/04; H04W 74/0816
USPC .......................................................... 370/329
See application file for complete search history.

(56) References Cited

U.S. PATENT DOCUMENTS

| 8,121,145 | B2 | 2/2012 | Hafeez et al. | |
| 8,937,912 | B2 * | 1/2015 | Mazet | H04W 74/0816 370/329 |
| 2003/0181165 | A1 * | 9/2003 | Sugar | H04B 7/0615 455/69 |
| 2008/0144493 | A1 * | 6/2008 | Yeh | H04W 52/50 370/230 |

(Continued)

FOREIGN PATENT DOCUMENTS

KR    1020100065355 A    6/2010

OTHER PUBLICATIONS

Guner D. Celik et al., MAC for Networks with Multipacket Reception Capability and Spatially Distributed Nodes, Apr. 2008, pp. 1436-1444, IEEE INFOCOM.

(Continued)

*Primary Examiner* — Steven H Nguyen
*Assistant Examiner* — Emmanuel Maglo
(74) *Attorney, Agent, or Firm* — Hauptman Ham, LLP (57) ABSTRACT Disclosed is a wireless communication system including: an access point; and at least two wireless devices capable of transmitting packets to the access point at the same time, wherein the access point receives a packet from at least one of the at least two wireless devices within multi-packet reception (MPR) capability after determining whether packet reception is beyond the multi-packet reception (MPR) capability, when receiving a request to send (RTS) from one of the at least two wireless devices. Thus, it is possible to obtain maximum throughput by optimally using the MPR capability and stably perform packet communication even though the number of wireless devices changes or the wireless device is moved.

9 Claims, 4 Drawing Sheets

| γ | MPR capability (M) | | | | | | | | | | | | | | | | | |
|---|---|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 | 18 | 19 | 20 |
| 0.05 | 3 | 4 | 5 | 6 | 7 | 7 | 8 | 9 | 10 | 10 | 11 | 12 | 12 | 13 | 13 | 14 | 14 | 15 |
| 0.1 | 2 | 3 | 4 | 4 | 5 | 5 | 6 | 6 | — | — | — | — | — | — | — | — | — | — |
| 0.2 | 2 | 2 | 3 | — | — | — | — | — | — | — | — | — | — | — | — | — | — | — |

(56) References Cited

U.S. PATENT DOCUMENTS

| | | | |
|---|---|---|---|
| 2009/0022170 A1* | 1/2009 | Mehta | H04W 52/286 370/410 |
| 2009/0086706 A1* | 4/2009 | Huang | H04L 1/0026 370/349 |
| 2010/0014452 A1* | 1/2010 | Ueba | H04W 28/04 370/315 |
| 2010/0027490 A1* | 2/2010 | Mazet | H04W 74/0816 370/329 |
| 2011/0194644 A1* | 8/2011 | Liu | H04L 5/0023 375/295 |
| 2011/0205961 A1* | 8/2011 | Santivanez | H04W 74/0816 370/328 |
| 2011/0261709 A1* | 10/2011 | Barghi | H04L 1/0668 370/252 |
| 2012/0026989 A1* | 2/2012 | Barghi | H04L 1/0668 370/336 |
| 2012/0191342 A1* | 7/2012 | Kang | G01C 21/365 701/423 |
| 2012/0327870 A1* | 12/2012 | Grandhi | H04W 28/06 370/329 |

OTHER PUBLICATIONS

Andrea Zanella et al., Capture Analysis in Wireless Radio Systems with Multi-Packet Reception Capabilities, 2009, pp. 616-620, IEE INFOCOM.

(Exception to Loss of Novelty) Wooyeol Choi et al., Admission Control for Wireless LANs with Multi-Packet Reception Capability, Research Letter, Published in the Transactions on Emerging Telecommunications Technologies on Aug. 14, 2013.

\* cited by examiner

| γ | MPR capability (M) | | | | | | | | | | | | | | | | | |
|---|---|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 | 18 | 19 | 20 |
| 0.05 | 3 | 4 | 5 | 6 | 7 | 7 | 8 | 9 | 10 | 10 | 11 | 12 | 12 | 13 | 13 | 14 | 14 | 15 |
| 0.1 | 2 | 3 | 4 | 4 | 5 | 5 | 6 | 6 | – | – | – | – | – | – | – | – | – | – |
| 0.2 | 2 | 2 | 3 | – | – | – | – | – | – | – | – | – | – | – | – | – | – | – |

Fig. 4

WIRELESS COMMUNICATION SYSTEM AND PACKET COMMUNICATION THEREFOR

CROSS REFERENCE TO RELATED APPLICATION

This application claims the benefit of Korean Patent Application No. 10-2013-0138075, filed on Nov. 14, 2013, entitled "WIRELESS COMMUNICATION SYSTEM AND PACKET COMMUNICATION THEREFOR", which is hereby incorporated by reference in its entirety into this application.

BACKGROUND

1. Technical Field

The present invention relates to a wireless communication system and a packet communication method of the wireless communication system, and more particularly to a wireless communication system which can improve throughput of a wireless network and a packet communication method of the wireless communication system.

2. Description of the Related Art

In a wireless communication system, wireless devices are wirelessly connected to one another through an access point. A conventional access point can receive only one packet at the same time, but a recent access point can simultaneously receive a plurality of packets with the advent of multiuser detection (MUD), the development of signal processing technology, and the advent of multi-antenna technology. At this time, the number of packets receivable at the same time is defined by multi-packet reception capability (hereinafter also referred to as MPR capability). In a current wireless communication system, MPR capability is set as a certain value regardless of actual MPR capability, and thus packets are received from the wireless device at the rate set by the MPR capability.

However, the MPR capability is varied depending upon mobility of the wireless device, the structure of a wireless communication system and the kind of wireless device. Thus, when the MPR capability set in the wireless communication system is lower than actual MPR capability, resources of the wireless communication system are wasted. In other words, usable resources are not used and network throughput is lowered. On the other hand, if the MPR capability set in the wireless communication system is higher than the actual MPR capability, it is impossible to decode signals simultaneously received at the access point, thereby deteriorating stability of the wireless communication system.

Such problems occur more significantly due to increase in the number of wireless devices to be used in a limited space, increase in communication traffic, increase in mobility of a wireless device, limited resources of a wireless network, and so on.

Under such background, there is a need for technology in which throughput of a wireless network is improved by allowing maximum use of MPR capability in a wireless communication system.

BRIEF SUMMARY

The present invention is proposed under the background set forth above, and it is an aspect of the present invention to provide a wireless communication system and a packet communication method of the wireless communication system, in which wireless communication can be stably performed by optimally treating change in the number of wireless devices participating in the wireless communication system, optimally coping with change in communication environments due to movement of the wireless device, and allowing maximum use of limited resources of the wireless network.

In accordance with one aspect of the present invention, a wireless communication system includes: an access point; and at least two wireless devices capable of transmitting packets to the access point at the same time, wherein the access point receives a packet from at least one of the at least two wireless devices within multi-packet reception (MPR) capability after determining whether packet reception is beyond the multi-packet reception (MPR) capability, when receiving a request to send (RTS) from one of the at least two wireless devices. With this structure, the wireless communication system can fully obtain actual MPR capability.

Here, the access point may determine whether packet reception is currently beyond the multi-packet reception (MPR) capability each time the request to send is received. The access point may receive a packet from a wireless device corresponding to a previously received request to send (RTS) excluding a current wireless device targeted for determination, when it is determined that packet reception is beyond the multi-packet reception (MPR) capability. When there are at least two wireless devices corresponding to the previously received request to send (RTS), the access point may receive packets from the at least two wireless devices at the same time.

In addition, the wireless devices may include a tablet personal computer (PC), an Internet telephone, and an Internet television (TV).

Determination as to whether packet reception is beyond the multi-packet reception (MPR) capability may be performed using an index M of a wireless device having minimum reception power and reception power $Pr_M$ of a signal received from the $M^{th}$ wireless device as variables. With this structure, the wireless communication system can fully utilized limited resources of the access point while securing stable determination.

In accordance with another aspect of the present invention, a packet communication method of a wireless communication system includes: by an access point, receiving a request to send (RTS); determining whether to wait for an additional request to send (RTS); and by the access point, waiting for the additional request to send (RTS), when it is determined to wait for the additional request to send (RTS), and transmitting a clear to send (CTS) to a wireless device, which can transmit packets simultaneously with another wireless device, corresponding to the request to send (RTS) received up to a current point of time, and receiving the packet from the wireless device, when it is determined not to wait for the additional request to send (RTS). According to the present invention, the wireless communication system can have an advantage of obtaining maximum throughput.

In the method, determination as to whether to wait for the additional request to send may be performed each time there is a request to send. Thus, the packets can be fully transmitted at the same time in accordance with varying network environments. Further, determination as to whether to wait for the additional request to send may be performed using a function $f=(M, Pr_M)$. Thus, the access point can fully achieve the foregoing method. At this time, the function $f=(M, Pr_M)$ satisfies $$Pr_M \geq \frac{N\gamma}{1-(M-1)\gamma},$$

where M is an index of a node having minimum reception power, $Pr_M$ is reception power of a signal received from the $M^{th}$ node, N is background noise power, and $\gamma$ is a capture threshold. With this expression, it is possible to easily obtain the actual MPR capability. On the other hand, the wireless device corresponding to the request to send (RTS) used in determining whether to wait for the additional request to send (RTS) may be excluded from target wireless devices that transmit the packets at the same time. Thus, a problem of collision between access points or non-reception is solved, and the wireless communication system can be stably operated.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, embodiments of the invention will be described in detail with reference to the accompanying drawings. It should be understood that the present invention is not limited to the following embodiments and various modifications, variations, alterations and additions can be made by those skilled in the art without departing from the spirit and scope of the invention.

Figure 1:
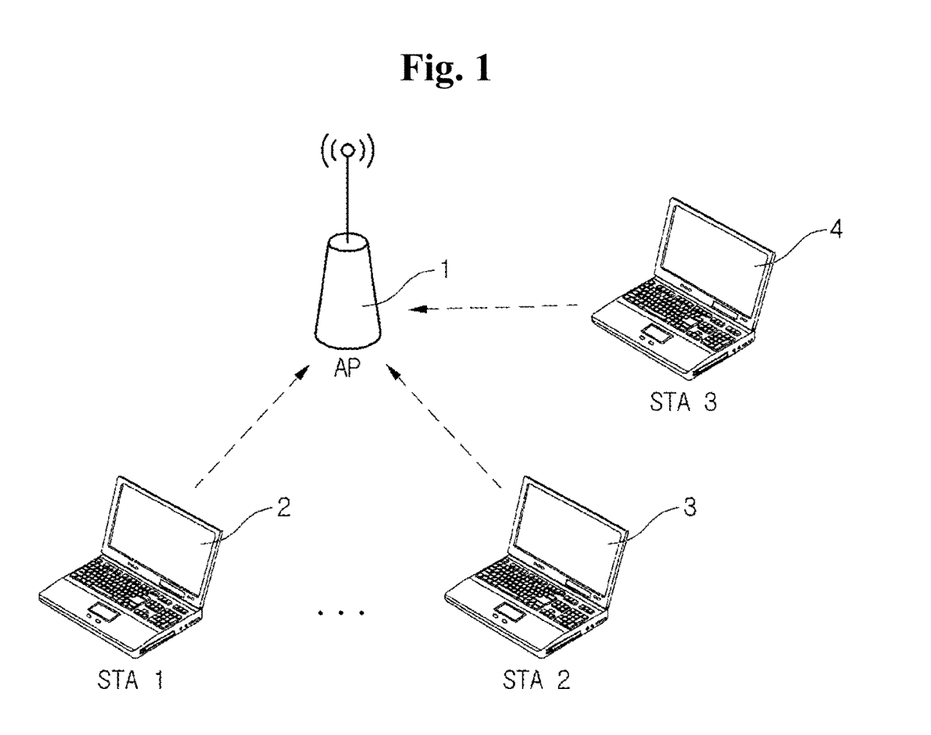
FIG. 1 illustrates a wireless communication system according to one embodiment of the present invention.

FIG. 1 illustrates a wireless communication system according to one embodiment of the present invention.

Referring to FIG. 1, a wireless communication system according to the embodiment of the invention is provided with an access point 1, and first, second and third wireless devices 2, 3, 4, which transmit signals to the access point 1. Of course, a lot of wireless devices as well as the first, second and third wireless devices 2, 3 and 4 may be provided to the wireless communication system. Here, it will be appreciated that the access point 1 includes any kind of device capable of receiving packets from a plurality of wireless devices and processing the packets. By way of example, the wireless devices include tablet personal computers (PC), Internet telephones, Internet televisions (TVs), and the like.

With such configuration, the wireless communication system is operated as follows. For example, the first wireless device 2 transmits a request to send (RTS) to the access point 1. The access point 1 receives the RTS from the first wireless device 2 and determines whether to wait for an additional RTS from another wireless device.

Specifically, determination as to whether to wait for the additional RTS may be performed based on the following Expression 1:

$$Pr_M \geq \frac{N\gamma}{1-(M-1)\gamma}, \qquad (1)$$

where M is an index of a node having minimum reception power (herein, the node may be regarded as a wireless device), N is background noise power, $\gamma$ is a capture threshold, and $P_{rM}$ is reception power of a signal received from the $M^{th}$ node. Here, N and $\gamma$ may be values previously determined in the wireless communication system.

When Expression 1 is satisfied as the left side is greater than or equal to the right side, the access point 1 does not transmit a clear to send (CTS) and waits for the RTS from the next wireless device. That is, the access point 1 waits for the RTS from the second and third wireless devices 3, 4, and other wireless devices. This shows that actual MPR capability of the current wireless communication system exceeds current MPR, and it is thus determined that the access point 1 can simultaneously receive packets from more wireless devices and waits for an additional RTS from another wireless device.

By way of example, in the case of the first wireless device 2, the current M becomes 1, and if Expression 1 is not satisfied with regard to the first wireless device, it can be considered that the access point 1 cannot transmit any packet to any wireless device and that the status of wireless communication is extremely bad. In this case, the maximum M value ($M_{max}$) is 0 and it can be understood that the access point 1 cannot receive any packet from any wireless device. However, such a case rarely happens to an RTS of a single wireless device since there is no interruption between wireless devices.

Then, for example, if an RTS is received from the second wireless device 3, current M is 2 and $P_{rM}$ is $P_{r2}$ which is power of a signal received from the second wireless device 3. When the current M and $P_{r2}$ for the second wireless device are substituted into Expression 1 and Expression 1 is satisfied as the left side is greater than or equal to the right side, the access point 1 does not transmit a CTS and waits for a RTS from the next wireless device. In this case, the maximum M value ($M_{max}$) is not determined yet.

On the other hand, if Expression 1 is not satisfied as the left side is smaller than the right side, the access point 1 transmits the CTS to the first wireless device 2 and the first wireless device 2 transmits a packet to the access point 1. When transmission is completed, the access point 1 transmits an acknowledgement signal to the first wireless device 2. In this case, the maximum M value ($M_{max}$) is 1.

The foregoing operation may be repetitively performed until Expression 1 is not satisfied. Through such a repetitive operation, the maximum M can be obtained and the MPR capability of the wireless communication system can be fully utilized.

As described above, in the wireless communication system according to the embodiment, it is determined whether the actual MPR capability in the current wireless communication system can support the current M each time an RTS is received from each of wireless devices. Therefore, maximum multi-packet reception can be achieved by waiting for an additional RTS from another wireless device until the actual MPR capability of the current wireless communication system cannot support the current M. According to another aspect, it is possible to obtain the maximum M achievable by the actual MPR capability of the current wireless communication system, thereby fully utilizing the multi-packet reception capability.

According to one embodiment, when the configuration and environment of the current wireless communication system are fully utilized and the wireless communication system is variable upon movement of the wireless device, it is possible for the current wireless communication system to achieve maximum use of the actual MPR capability.

Next, the process of deriving Expression 1 will be described in more detail.

As a typical method of determining MPR capability of a wireless communication system, a method based on noise of the wireless communication system represented by Expression 2 is known in the art.

$$SINR_i = \frac{Pr_i}{\sum_{j=1,j\neq i}^{M} Pr_j + N} \geq \gamma \qquad (2)$$

In this expression, reception power $Pr_i$ of an $i^{th}$ wireless device is $R^2 K \cdot r_i^{-\beta} Pt_i$, where R is a Rayleigh-distributed random variable for fading, $K \cdot r_i^{-\beta}$ is attenuation at a certain distance having a loss exponent $\beta$, and $Pt_i$ is transmission power at the $i^{th}$ node. Here, it will be understood that r is a value of distance from the wireless device and is variable depending upon the wireless device, and $Pt_i$ is an adjustable value.

Expression 2 represents that multi packets can be successfully received at the same time if the reception power exceeds the capture threshold γ when a channel environment is variable under noise conditions. For more detailed explanation, refer to "MAC for networks with multipacket reception capability and spatially distributed nodes" (Celik G, Zussman G, Khan W, Modiano E., IEEE Conference on Computer Communications (INFOCOM) 2008: 1436-1444) and "Capture analysis in wireless radio systems with multi-packet reception capabilities" (Zanella A, Rao R R, Zorzi M., IEEE International Symposium on Information Theory (ISIT) 2009; 61-620). Further, it will be appreciated that references related to Expression 2 are incorporated herein for understanding.

Expression 2 may be used when a new node, i.e. a wireless device, transmits a new RTS. However, it is practically impossible to derive each operation of Expression 2 at the access point 1 since the access point 1 has limited resources. For example, in Expression 2, the reception power is calculated and determined when there is an RTS from a certain wireless device, and the calculated reception power is stored. Then, the calculated reception power is called and used again when there is an RTS from a subsequent wireless device. Further, the stored reception power of both the first and second wireless devices is called and used when there is an RTS from a third wireless device. Therefore, there is a problem with excessive use of the resources of the access point 1. In addition, since parameters used in calculation of the reception power widely vary, it is very difficult to calculate a correct value.

To solve the foregoing problem, the inventor of the present invention derives a new relational expression for determining whether a packet is receivable from a current wireless device (i.e. a wireless device that transmits a current RTS), when there is an RTS from each wireless device. Next, the process of obtaining the relational expression will be described.

The inequality of Expression 2 can be converted into Expression 3.

$$Pr_i \geq \gamma \left( \sum_{j=1,j\neq i}^{M} Pr_j + N \right) \qquad (3)$$

When the left sides and the right sides are separately summed while substituting i from 1 to M into Expression 3, the following Expression 4 is established.

$$\sum_{i=1}^{M} Pr_i \geq \gamma \left\{ (M-1) \cdot \sum_{i=1}^{M} Pr_i + MN \right\} \qquad (4)$$

When Expression 4 is rearranged with respect to Σ, the following Expression 5 is established.

$$\sum_{i=1}^{M} Pr_i \geq \frac{MN\gamma}{1-(M-1)\gamma} \qquad (5)$$

On the other hand, Expression 3 can be transformed into Expression 6.

$$\frac{Pr_M}{\gamma} - N \geq Pr_1 + Pr_2 + \ldots + Pr_{M-1} \qquad (6)$$

Here, it is assumed that i varies up to M and $Pr_1 \geq Pr_2 \geq \ldots \geq Pr_M$ is satisfied. Therefore, M is an index of a node (i.e., a wireless device) having minimum reception power.

When $Pr_M$ is added to both sides of Expression 6, the right side becomes a term corresponding to the left side of Expression 5. Then, when Expression 5 and Expression 6 are respectively set to the right side and the left side with the mathematical sign of Σ therebetween, Expression 7 is derived.

$$Pr_M \left( 1 + \frac{1}{\gamma} \right) - N \geq \frac{MN\gamma}{1-(M-1)\gamma} \qquad (7)$$

If Expression 7 is rearranged with respect to $Pr_M$, Expression 1 is derived. Therefore, it is possible to obtain the maximum M through Expression 1. Thus, since N and γ are defined depending upon the wireless communication system, the maximum M is obtained by repetitively calculating Expression 1 while increasing M from 1. That is, the maximum M can be simply obtained by calculating the right side of Expression 1 with only M and $Pr_M$ and comparing the calculated value with $Pr_M$ at the left side. In other words, the maximum M can be obtained only with a simple discriminant of the function f=(M, PrM). Thus, the maximum M can be determined more simply than that of Expression 2 requiring all $Pr_i$ up to a current point of time, regardless of variation in the network. Consequently, it is possible to simply obtain the maximum M for enabling maximum use of the MPR capability, and maximize the number of packets to be transmitted at the same time.

Figure 2:
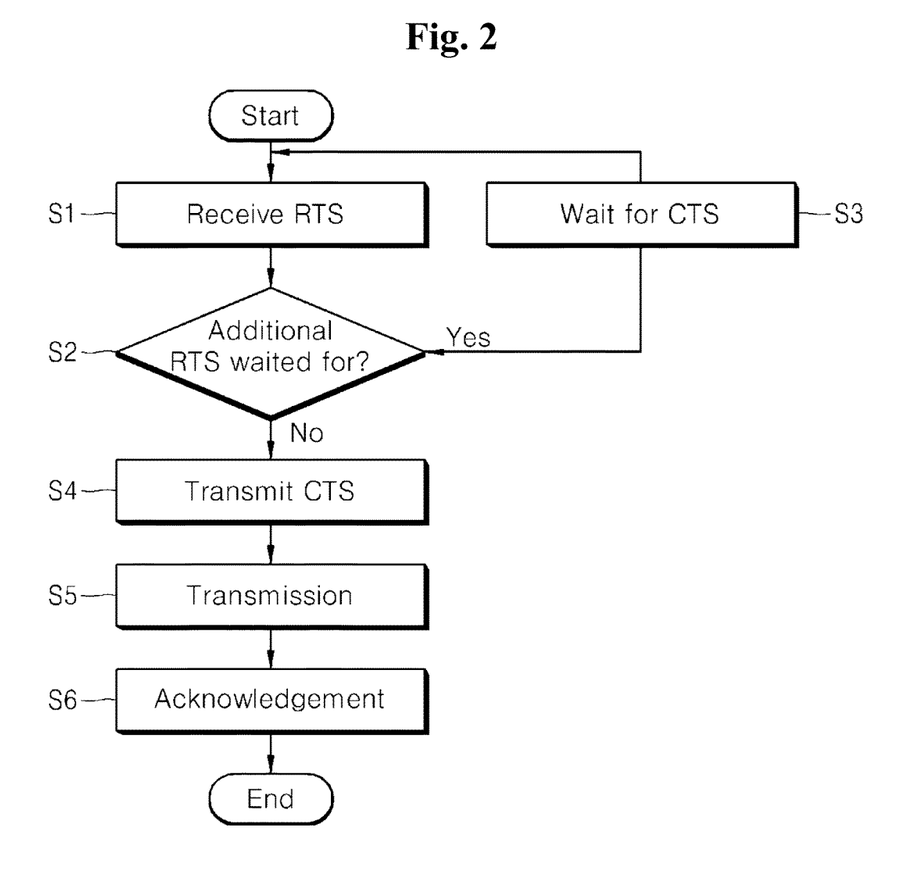
FIG. 2 is a flowchart of a packet communication method of the wireless communication system according to one embodiment of the present invention.

FIG. 2 is a flowchart of a packet communication method of the wireless communication system according to one embodiment of the present invention.

Referring to FIG. 2, when the access point receives an RTS from a wireless device (S1), it is determined based on Expression 1 whether to wait for another RTS (S2). If the wireless communication system has a channel to spare (that is, if the access point has a spare MPR capability and can receive additional packets transmitted at the same time), the access point waits for the RTS from the other wireless device (S3). Otherwise, the access point transmits a CTS to the wireless device (S4). Then, the access point receives a packet from the wireless device that has sent the RTS (S5) and transmits an acknowledgement signal (S6), thereby completing packet communication of the wireless communication system.

According to this embodiment, the wireless communication system can allow maximum use of MPR capability, easily and quickly obtain the maximum M while scarcely using internal resources of the access point, and perform packet communication through stable determination under conditions that parameters are severely varied.

Figure 3:
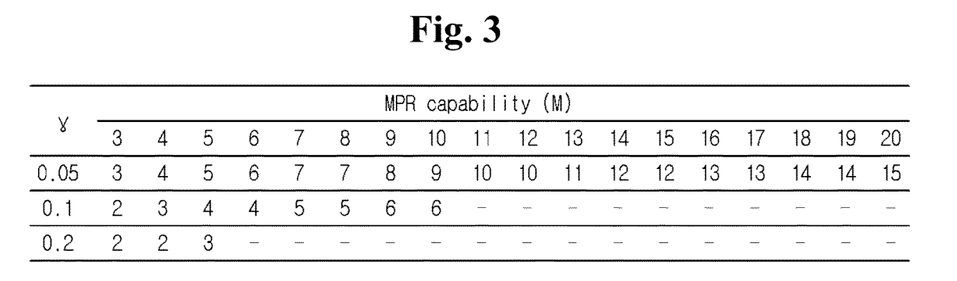
FIG. 3 is a view showing a simulation result according to one embodiment of the present invention.

FIG. 3 is a view showing a simulation result according to one embodiment.

In this simulation, $\gamma$ is changed to 0.05, 0.1 and 0.2, devices of the wireless communication system are evenly distributed in a disc region, and M is changed from 3 to 20. Here, it will be understood that M is the number of wireless devices. In addition, $Pr_M$ is $R^2 K \cdot r_i^{-\beta} Pt_i$, and thus M is obtained based on $R^2 K \cdot r_i^{-\beta} Pt_M$ when i=M. Thus, it will be understood that M is varied depending upon a distance r from a randomly selected wireless device.

According to simulation results, the maximum M is substantially the same as M if M is small, since interference between transmission nodes is not significant. Likewise, the maximum M becomes smaller than M as M increases. The reason can be interpreted as a certain RTS is rejected to obtain a higher throughput. For example, if $\gamma$ is 0.05 and M is 20, fifteen wireless devices among 20 wireless devices can transmit packets at the same time.

As $\gamma$ increases, the number of wireless devices capable of transmitting packets at the same time decreases. For example, if $\gamma$ is changed into 0.05, 0.1 and 0.2 at M=5, the maximum M is changed into 5, 4 and 3.

According to the simulation results of FIG. 3, the number of packets to be transmitted at the same time is adaptively optimized corresponding to the conditions of the wireless communication system.

Figure 4:
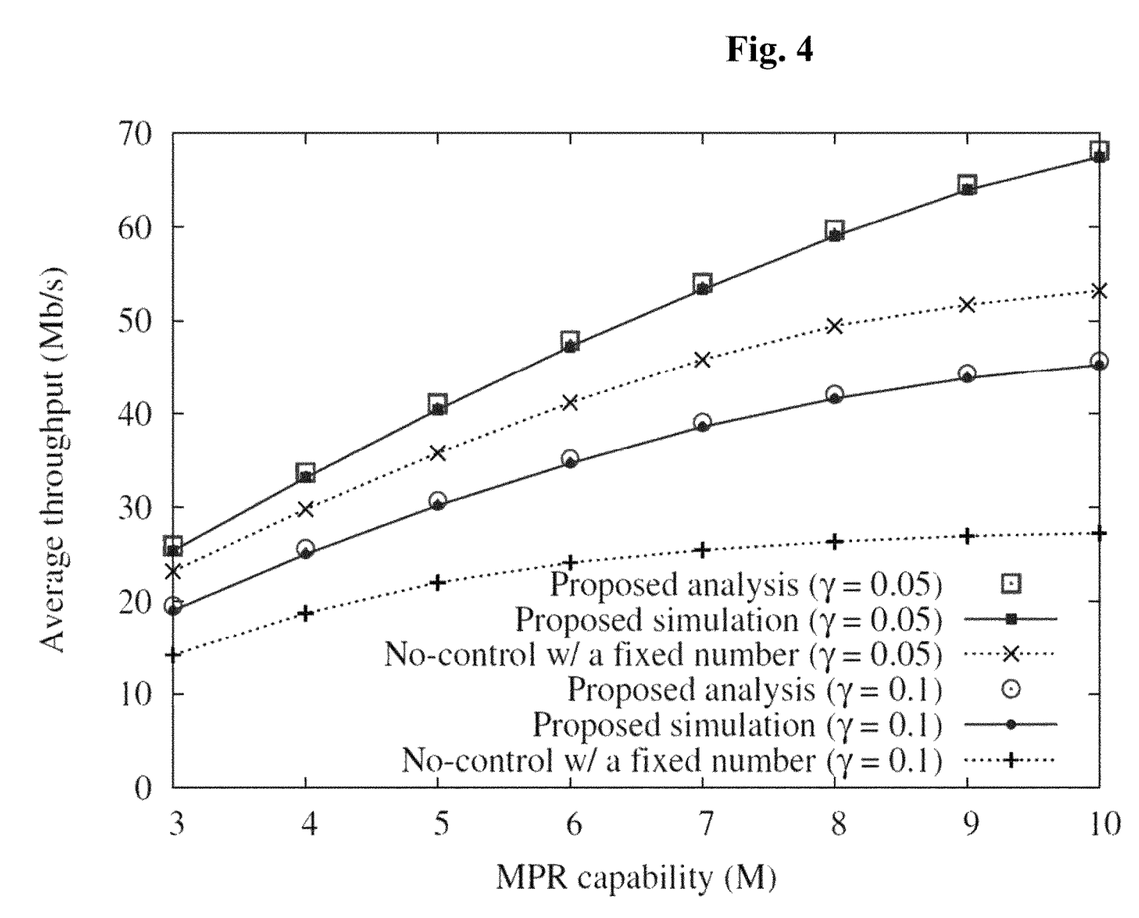
FIG. 4 is a graph showing results of simulating throughput.

FIG. 4 is a graph showing simulation results of throughput.

An experiment of FIG. 4 was performed under conditions that wireless devices were randomly distributed within a region having a radius of 300 m; an access point was placed at the center of the region; control packets of RTS, CTS, and ACK were set to have a transmission rate of 6 Mb/s; a data packet was set to have a transmission rate of 54 Mb/s, and overheads of each control packet were smaller than duration of distributed inter frame space (DIFS). In addition, each wireless device was controlled to transmit as many user datagram protocol (UDP) packets as possible. More detailed conditions of the experiment are shown in Table 1.

TABLE 1

| System Parameters | |
|---|---|
| RTS | 160 bits |
| CTS | 112 bits |
| Header | 272 bits |
| Packet length | 8000 bits |
| ACK | 112 bits |
| SIFS | 10 μs |

TABLE 1-continued

| System Parameters | |
|---|---|
| DIFS | 28 μs |
| Transmit power | 0 dBm |
| Basic rate | 54 Mb/s |
| Basic rate | 54 Mb/s |

The simulation results showed that the throughput was enhanced with increasing MPR capability and was improved as compared with that in the case where the maximum M was not adjustable.

According to the present invention, the wireless communication system can fully use MPR capability thereof, easily and quickly obtain maximum M while scarcely using resources of an access point, and improve throughput even under conditions that parameters are severely varied. In particular, the present invention is more adaptively applied when the number of wireless devices is great. Accordingly, the present invention can be applied in various ways to wireless communication systems, such as Internet routers, ad-hoc networks, home networks, and the like.

As described above, the wireless communication system can optimally use MPR capability to obtain maximum throughput and can perform stable packet communication even though the number of wireless devices is changed and the wireless devices are moved.

Although some embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. A wireless communication system comprising:
   an access point; and
   at least two wireless devices capable of transmitting packets to the access point at the same time,
   wherein the access point, in response to receiving a request to send (RTS) from one of the at least two wireless devices, receives a packet from at least one of the at least two wireless devices within multi-packet reception (MPR) capability after determining whether packet reception of the access point is beyond the multi-packet reception (MPR) capability,
   wherein the access point determines whether to wait for an additional request to send (RTS) based on a function f=(M, $Pr_M$), the function f=(M, $Pr_M$) satisfies $$Pr_M \geq \frac{N\gamma}{1-(M-1)\gamma},$$

where M is an index of a node having minimum reception power, $Pr_M$ is reception power of a signal received from the $M^{th}$ node, N is background noise power, and $\gamma$ is a capture threshold.

2. The wireless communication system according to claim 1, wherein the access point determines whether packet reception is currently beyond the multi-packet reception (MPR) capability each time the request to send is received.

3. The wireless communication system according to claim 1, wherein the access point receives a packet from a wireless device corresponding to a previously received request to send (RTS) excluding a current wireless device targeted for determination, when the access point determined that packet reception is beyond the multi-packet reception (MPR) capability.

4. The wireless communication system according to claim 1, wherein the wireless devices comprise a tablet personal computer (PC), an Internet telephone, and an Internet television (TV).

5. The wireless communication system according to claim 1, wherein determination as to whether packet reception is beyond the multi-packet reception (MPR) capability is performed using the index M and the reception power $Pr_M$ as variables.

6. The wireless communication system according to claim 3, wherein, when there are at least two wireless devices corresponding to the previously received request to send (RTS), the access point receives packets from the at least two wireless devices at the same time.

7. A packet communication method of a wireless communication system, the method comprising:
   by an access point, receiving a request to send (RTS);
   by the access point, determining whether to wait for an additional request to send (RTS) after receiving the RTS; and
   by the access point, waiting for the additional request to send (RTS), when the access point is determined to wait for the additional request to send (RTS), and transmitting a clear to send (CTS) to a wireless device, which can transmit packets simultaneously with another wireless device, corresponding to the request to send (RTS) received up to a current point of time, and receiving the packet from the wireless device, when the access point is determined not to wait for the additional request to send (RTS),
   wherein determination as to whether to wait for the additional request to send is performed using a function f=(M, $Pr_M$), the function f=(M, $Pr_M$) satisfies $$P_{r_M} \geq \frac{N\gamma}{1-(M-1)\gamma},$$

where M is an index of a node having minimum reception power, $Pr_M$ is reception power of a signal received from the $M^{th}$ node, N is background noise power, and γ is a capture threshold.

8. The packet communication method according to claim 7, wherein determination as to whether to wait for the additional request to send is performed each time there is a request to send.

9. The packet communication method according to claim 7, wherein the wireless device corresponding to the request to send (RTS) used in determining whether to wait for the additional request to send (RTS) is excluded from target wireless devices that transmit the packets at the same time.

* * * * *